(12) United States Patent
Tokumaru

(10) Patent No.: US 12,221,143 B2
(45) Date of Patent: Feb. 11, 2025

(54) ON-BOARD APPARATUS, GROUND APPARATUS, AND TRAIN CONTROL SYSTEM

(71) Applicant: Mitsubishi Electric Corporation, Tokyo (JP)

(72) Inventor: Makoto Tokumaru, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 866 days.

(21) Appl. No.: 17/424,049

(22) PCT Filed: Jan. 30, 2019

(86) PCT No.: PCT/JP2019/003211
§ 371 (c)(1),
(2) Date: Jul. 19, 2021

(87) PCT Pub. No.: WO2020/157872
PCT Pub. Date: Aug. 6, 2020

(65) Prior Publication Data
US 2022/0081015 A1 Mar. 17, 2022

(51) Int. Cl.
*B61L 3/12* (2006.01)
*B60L 9/24* (2006.01)
(Continued)

(52) U.S. Cl.
CPC ........ *B61L 3/12* (2013.01); *B60L 9/24* (2013.01); *B61L 23/14* (2013.01); *B61L 25/02* (2013.01);
(Continued)

(58) Field of Classification Search
CPC .. B61L 3/12; B61L 23/14; B61L 25/02; B61L 2201/00; B60L 9/24; B60L 2200/26
See application file for complete search history.

(56) References Cited

U.S. PATENT DOCUMENTS

2019/0115575 A1    4/2019  Chikamori et al.

FOREIGN PATENT DOCUMENTS

JP    2012106571 A    6/2012
JP    5558320 B2 *   7/2014   ............... B61L 3/12
(Continued)

OTHER PUBLICATIONS

International Search Report (PCT/ISA/210) with translation and Written Opinion (PCT/ISA/237) mailed on Apr. 16, 2019, by the Japan Patent Office as the International Searching Authority for International Application No. PCT/JP2019/003211.
(Continued)

*Primary Examiner* — Robert J McCarry, Jr.
(74) *Attorney, Agent, or Firm* — BUCHANAN, INGERSOLL & ROONEY PC

(57) ABSTRACT

An on-board apparatus to be installed on a train, the apparatus including; an on-board control device that controls running and stopping of the train during operation of the train; and an on-board wireless device that performs wireless communication with a ground apparatus, and starts the on-board control device when receiving a first signal from the ground apparatus while the train is staying overnight, the first signal notifying that the train moves, wherein while the train is staying overnight, the on-board control device is started under the control of the on-board wireless device, and performs control so as to stop the train.

20 Claims, 8 Drawing Sheets

(51) Int. Cl.
*B61L 23/14* (2006.01)
*B61L 25/02* (2006.01)

(52) U.S. Cl.
CPC ....... *B60L 2200/26* (2013.01); *B61L 2201/00* (2013.01)

(56) References Cited

FOREIGN PATENT DOCUMENTS

| JP | 2016046921 A | | 4/2016 | |
|----|--------------|---|--------|---|
| JP | 2016137731 A | * | 8/2016 | .............. B61L 23/14 |
| WO | 2017183111 A1 | | 10/2017 | |

OTHER PUBLICATIONS

Office Action dated Apr. 20, 2022, issued in corresponding Indian Patent Application No. 202127032259, 5 pages.
Hearing Notice dated Mar. 16, 2024, issued in the corresponding Indian Patent Application No. 202127032259, 2 pages.

* cited by examiner

ON-BOARD APPARATUS, GROUND APPARATUS, AND TRAIN CONTROL SYSTEM

FIELD

The present invention relates to an on-board apparatus to be installed on a train, a ground apparatus, and a train control system.

BACKGROUND

Conventionally, an on-board apparatus on a train calculates the location of the train on the basis of a result of detection by a sensor that detects movement of the train, and transmits location information on the train to a ground apparatus. The on-board apparatus controls running of the train by using stop limit information or the like acquired from the ground apparatus. When operation is finished, the train stays overnight at a specified place. In order to avoid a situation in which the location of the train is not fixed when the train moves on its own without being driven by power, the on-board apparatus calculates the location of the train even while the train is staying overnight, and transmits the location information on the train to the ground apparatus. As described above, the on-board apparatus calculates the location of the train even while the train is staying overnight. Thus, the train consumes power also during the overnight stay.

Patent Literature 1 discloses a technique of reducing power to be consumed by a train while the train is staying overnight, by cutting off power supply to an on-board safety device while the train is staying overnight, and causing a ground apparatus to calculate the location of the train on the basis of a result of sensor detection acquired from the train.

CITATION LIST

Patent Literature

Patent Literature 1: Japanese Patent Application Laid-open No. 2016-137731

SUMMARY

Technical Problem

However, according to the technique described in Patent Literature 1, there is a problem that the train needs to cause the sensor to constantly operate even while the train is staying overnight, so that power is consumed by the sensor even during the overnight stay.

The present invention has been made in view of the above, and an object of the present invention is to obtain an on-board apparatus capable of reducing power to be consumed while a train is staying overnight.

Solution to Problem

The present invention is intended to solve the above-described problem, and relates to an on-board apparatus to be installed on a train. The on-board apparatus according to an aspect includes: an on-board control device that controls running and stopping of the train during operation of the train; and an on-board wireless device that performs wireless communication with a ground apparatus, and starts the on-board control device when receiving a first signal from the ground apparatus while the train is staying overnight, the first signal notifying that the train moves. The on-board control device is started under the control of the on-board wireless device while the train is staying overnight, and performs control so as to stop the train.

Advantageous Effects of Invention

According to the present invention, the on-board apparatus has an effect of enabling a reduction in power to be consumed while a train is staying overnight.

DESCRIPTION OF EMBODIMENTS

Hereinafter, on-board apparatuses, ground apparatuses, and train control systems according to embodiments of the present invention will be described in detail with reference to the drawings. Note that the present invention is not limited to the embodiments.

First Embodiment

Figure 1:
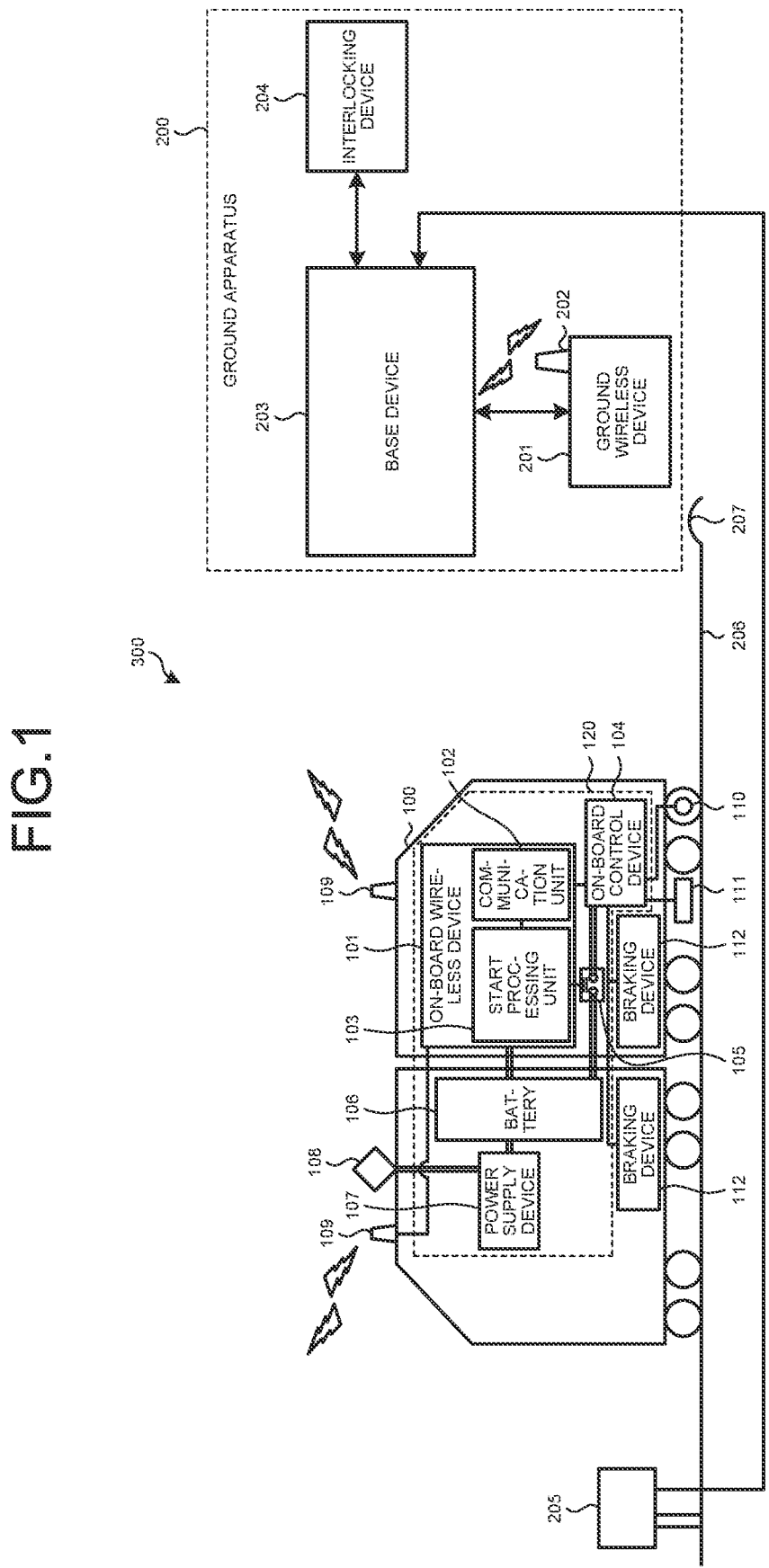
FIG. 1 is a diagram showing a configuration example of a train control system according to a first embodiment.

FIG. 1 is a diagram showing a configuration example of a train control system 300 according to a first embodiment of the present invention. The train control system 300 includes a train 100, a ground apparatus 200, and a train movement detection sensor 205. In the train control system 300, the train 100 calculates the location of the train 100, and transmits location information on the train 100 to the ground apparatus 200. The ground apparatus 200 calculates stop limit information on the basis of the location information acquired from the train 100, and transmits the stop limit information to the train 100. The train 100 runs or stops by using the stop limit information and the like.

When operation is finished, the train 100 stays overnight at a specified place such as a train shed or storage tracks. The train 100 is generally stopped while staying overnight, but may move under the effect of a strong wind or the like, that is, move on its own without being driven by power of the train 100. In the present embodiment, when the train 100 moves while staying overnight, the ground apparatus 200 detects the movement of the train 100 on the basis of a result of detection by the train movement detection sensor 205, and notifies the train 100 of the movement of the train 100. In the train 100, an on-board control device 104 is started in response to the notification from the ground apparatus 200. The started on-board control device 104 performs control so as to stop the train 100.

A configuration of the train 100 will be described. The train 100 includes an on-board wireless device 101, the on-board control device 104, a switch 105, a battery 106, a power supply device 107, a pantograph 108, antennas 109, a tacho-generator 110, a pickup coil 111, and braking devices 112. The on-board wireless device 101 includes a communication unit 102 and a start processing unit 103. In addition, an on-board apparatus 120 to be installed on the train 100 includes the on-board wireless device 101, the on-board control device 104, the switch 105, the battery 106, and the power supply device 107. Note that with regard to constituent elements of the train 100, constituent elements necessary in the present embodiment are illustrated in FIG. 1, and description of general constituent elements is omitted.

The communication unit 102 performs wireless communication with the ground apparatus 200. The communication unit 102 transmits data, such as location information on the train 100 calculated by the on-board control device 104, to the ground apparatus 200 via the antennas 109 through wireless communication. In addition, the communication unit 102 receives control information, such as the stop limit information on the train 100 calculated by the ground apparatus 200, from the ground apparatus 200 via the antennas 109 through wireless communication.

In a case where while the train 100 is staying overnight, the communication unit 102 receives, from the ground apparatus 200, a first signal notifying that the train 100 has moved, the start processing unit 103 causes power to be supplied to the on-board control device 104 to start the on-board control device 104. Specifically, when receiving the first signal, the start processing unit 103 controls the switch 105 to connect the battery 106 and the on-board control device 104, and causes the battery 106 to supply power to the on-board control device 104. Normally, the start processing unit 103 controls the switch 105 such that the start processing unit 103 causes the battery 106 to supply power to the on-board control device 104 while the train 100 is in operation, and does not cause the battery 106 to supply power to the on-board control device 104 while the train 100 is staying overnight.

The tacho-generator 110 generates pulses the number of which corresponds to the number of revolutions of the wheels of the train 100, and outputs the generated pulses to the on-board control device 104.

The pickup coil 111 receives a telegraphic message from a ground coil (not illustrated) installed on the ground, and outputs information on the telegraphic message to the on-board control device 104. The telegraphic message received by the pickup coil 111 from the ground coil is, for example, location information indicating a location where the ground coil is installed.

The on-board control device 104 controls running and stopping of the train 100 during operation of the train 100. The on-board control device 104 calculates the speed of the train 100, a distance traveled by the train 100, and the like from the number of pulses acquired from the tacho-generator 110 and the diameter of the wheel of the train 100, and also calculates the location of the train 100 by using the telegraphic message acquired from the pickup coil 111, that is, the location information on the ground coil. The on-board control device 104 transmits data such as location information on the train 100 to the ground apparatus 200 via the on-board wireless device 101. In addition, the on-board control device 104 generates a stop deceleration pattern by using the stop limit information and the like acquired from the ground apparatus 200 via the on-board wireless device 101, and controls the running of the train 100 by using the generated stop deceleration pattern. When the speed of the train 100 exceeds the stop deceleration pattern, the on-board control device 104 outputs a brake command to the braking devices 112. The on-board control device 104 operates by receiving power supplied from the battery 106 while the train 100 is in operation, and is normally stopped without power supply from the battery 106 while the train 100 is staying overnight. In addition, in the present embodiment, the on-board control device 104 is started under the control of the start processing unit 103 while the train 100 is staying overnight, and performs control so as to stop the train 100.

The switch 105 connects or disconnects the battery 106 to or from the on-board control device 104 under the control of the start processing unit 103. When power is supplied from the battery 106 to the on-board control device 104, the switch 105 is turned on to connect the battery 106 and the on-board control device 104 under the control of the start processing unit 103. When power is not supplied from the battery 106 to the on-board control device 104, the switch 105 is turned off to disconnect the battery 106 from the on-board control device 104 under the control of the start processing unit 103. Note that the switch 105 may be configured such that the switch 105 can be manually turned on and off by a driver or the like.

The battery 106 stores power supplied from the power supply device 107 while the train 100 is in operation. The battery 106 supplies power to the on-board wireless device 101 while the train 100 is in operation and while the train 100 is staying overnight. The battery 106 supplies power to the on-board control device 104 via the switch 105. FIG. 1 illustrates the single battery 106. However, this is an example, and the battery 106 may include a plurality of batteries for the on-board wireless device 101 and the on-board control device 104.

The power supply device 107 converts power collected by the pantograph 108 from an overhead line (not illustrated) into power that can be used by pieces of equipment installed on the train 100. The power supply device 107 also performs rectification in a case where the power collected by the pantograph 108 from the overhead line is AC power. The power supply device 107 outputs the converted power to the battery 106.

The pantograph 108 is a power collector that collects power from the overhead line (not illustrated) and outputs the collected power to the power supply device 107.

The braking devices 112 decelerate the train 100 in response to the command from the on-board control device 104.

Note that although the train 100 is configured as a two-car train in FIG. 1, this is an example, and the train 100 may include three or more cars, or may be configured as a single-car train. In addition, pieces of equipment to be installed on each car are not limited to those in the example of FIG. 1.

A configuration of the ground apparatus 200 will be described. The ground apparatus 200 includes a ground wireless device 201, an antenna 202, a base device 203, and an interlocking device 204. Note that with regard to constituent elements of the ground apparatus 200, constituent elements necessary in the present embodiment are illustrated in FIG. 1, and description of general constituent elements is omitted.

The ground wireless device 201 performs wireless communication with the train 100. The ground wireless device 201 receives data, such as location information on the train 100 calculated by the train 100, through wireless communication via the antenna 202. In addition, the ground wireless device 201 transmits control information, such as stop limit information on the train 100 calculated by the base device 203, from the base device 203 to the train 100 through wireless communication via the antenna 202.

The base device 203 manages the location of the train 100 on the basis of data such as location information from the on-board control device 104 of the train 100. In a case where a plurality of the trains 100 is in operation, the base device 203 generates deceleration information, stop limit information, and the like for safely controlling intervals between the trains, and transmits these pieces of information to the train 100 via the ground wireless device 201. Furthermore, in a case where the base device 203 acquires, from the train movement detection sensor 205, a detection result indicating that the train 100 has moved while staying overnight, that is, the train 100 staying has moved on its own without being driven by power, the base device 203 generates a first signal for notifying that the train 100 has moved, and transmits the first signal to the train 100 via the ground wireless device 201.

The interlocking device 204 outputs control information to a switch, a railroad signal, and the like (not illustrated) while maintaining interlock, on the basis of information on the existence of trains on tracks, route control information, and the like. The information on the existence of trains on tracks is managed by the base device 203. The route control information is received from another train control system.

In the train control system 300, the train movement detection sensor 205 detects that the train 100 has moved while staying overnight, that is, the train 100 staying has moved on its own without being driven by power. For example, the train movement detection sensor 205 detects that the train 100 has moved while staying overnight, that is, the train 100 staying has moved on its own without being driven by power, based on whether electromagnetic waves have arrived or have not arrived in a specified section. The train movement detection sensor 205 is, for example, a sensor that is installed at a railroad crossing or the like and detects the incoming train 100. The train movement detection sensor 205 transmits a detection result to the base device 203. Note that the train movement detection sensor 205 may be installed at each place where the single train 100 can stay overnight, or may be installed at each place where a plurality of the trains 100 can stay overnight. When installed at each place where the single train 100 can stay overnight, the train movement detection sensor 205 can accurately detect movement of the train 100. When installed at each place where a plurality of the trains 100 can stay overnight, movement of a large number of the trains 100 can be detected by a small number of the train movement detection sensors 205.

In FIG. 1, rails 206 are installed at a place where the train 100 stays overnight. A bumping post 207 is installed at the place where the train 100 stays overnight.

Next, operation in the train control system 300 will be described in which the ground apparatus 200 detects movement of the train 100 and the train 100 stops the movement.

When operation is finished, the train 100 stays overnight at a specified place. At this time, the train 100 lowers the pantograph 108 under the control of the on-board control device 104 or the power supply device 107, and stops power supply from the overhead line. In addition, the start processing unit 103 of the on-board wireless device 101 turns off the switch 105 to disconnect the battery 106 from the on-board control device 104, and stops supply of power from the battery 106 to the on-board control device 104. That is, in the case of a normal overnight stay during which the train 100 does not move, power is supplied from the battery 106 to the on-board wireless device 101, but is not supplied from the battery 106 to the on-board control device 104 in the train 100. As a result, the train 100 can reduce power to be consumed by the train 100 during an overnight stay.

Power is not supplied from the battery 106 to the on-board control device 104. Therefore, the train 100 cannot calculate the location of the train 100. Meanwhile, power is supplied from the battery 106 to the on-board wireless device 101. Thus, the train 100 can receive a signal from the ground apparatus 200.

In the ground apparatus 200, the base device 203 periodically acquires a detection result from the train movement detection sensor 205. When acquiring, from the train movement detection sensor 205, a detection result indicating that the train 100 has moved, the base device 203 generates a first signal for notifying that the train 100 has moved, and transmits the generated first signal to the train 100 via the ground wireless device 201. In a case where the train movement detection sensor 205 is installed at a junction of tracks, that is, in the vicinity of a point, the base device 203 acquires information on the direction of the switch, and the like from the interlocking device 204, estimates a place where the train 100 was staying overnight, and identifies the train 100 that has moved. When it is not possible to identify just a single train as the train 100 that has moved, the base device 203 identifies a plurality of the trains 100 that may have moved from the place where the train movement detection sensor 205 is installed. That is, in a case where the train movement detection sensor 205 is installed at each place where the single train 100 can stay overnight, the base device 203 performs control so as to transmit the first signal to the single train 100. In addition, in a case where the train movement detection sensor 205 is installed at each place where a plurality of the trains 100 can stay overnight, the base device 203 performs control so as to transmit the first signal to the plurality of trains 100.

In the train 100 staying overnight, the communication unit 102 of the on-board wireless device 101 outputs, to the start processing unit 103, a signal received from the ground apparatus 200. The start processing unit 103 determines the type of the received signal. When determining that the first signal has been received, the start processing unit 103 turns on the switch 105 to supply power from the battery 106 to the on-board control device 104, and starts the on-board control device 104.

Upon being started, the on-board control device 104 calculates the location of the train 100. In a case where, as a result of calculating the location of the train 100, it is determined that the train 100 is moving even during an overnight stay, the on-board control device 104 performs control so as to stop the train 100 by controlling the braking devices 112. That is, in a case where the on-board control device 104 detects the movement of the train 100 while the train 100 is staying overnight, the on-board control device 104 performs control so as to stop the train 100. As a result, the on-board control device 104 of the train 100 can stop the train 100 even in a case where the train 100 moves while staying overnight.

Figure 2:
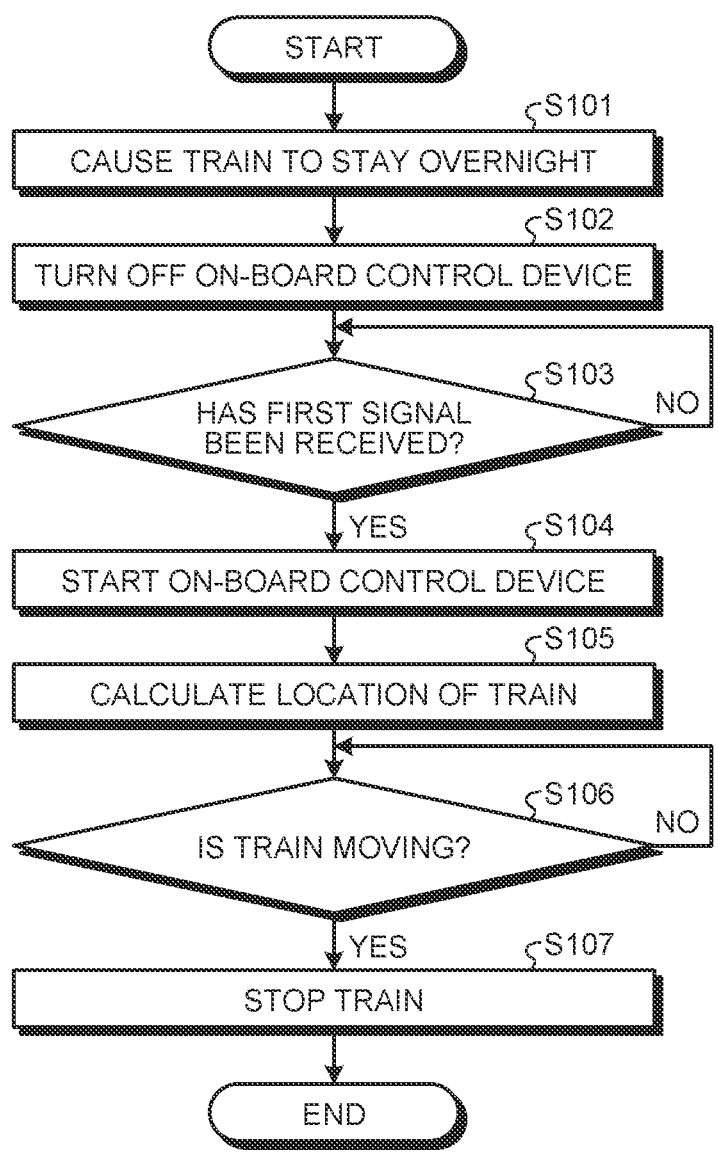
FIG. 2 is a flowchart illustrating operation of an on-board apparatus installed on a train according to the first embodiment.

Operation of the train 100 will be described with reference to a flowchart. FIG. 2 is a flowchart illustrating operation of the on-board apparatus 120 installed on the train 100 according to the first embodiment. When operation is finished, the train 100 stays overnight at a specified place (step S101). The start processing unit 103 of the on-board wireless device 101 turns off the switch 105 to stop power supply from the battery 106 to the on-board control device 104, and turns off the on-board control device 104 (step S102). The start processing unit 103 determines whether the first signal has been received from the ground apparatus 200 via the communication unit 102 (step S103). When the first signal has not been received from the ground apparatus 200 (step S103: No), the start processing unit 103 maintains the current state. When the first signal has been received from the ground apparatus 200 (step S103: Yes), the start processing unit 103 turns on the switch 105 to cause the battery 106 to supply power to the on-board control device 104, and starts the on-board control device 104 (step S104). Upon being started, the on-board control device 104 calculates the location of the train 100 (step S105). As a result of calculating the location of the train 100, the on-board control device 104 determines whether the train 100 is moving (step S106). When determining that the train 100 is not moving (step S106: No), the on-board control device 104 maintains the current state. The case where the train 100 is not moving refers to a case where movement of the train 100 has been detected by the ground apparatus 200, but the train 100 has already stopped. Note that in a case where it is determined that the train 100 is not moving, the on-board control device 104 may be turned off to end the operation. For example, the on-board control device 104 instructs the start processing unit 103 of the on-board wireless device 101 to turn off the switch 105 and stop power supply from the battery 106 to the on-board control device 104. When it is determined that the train 100 has moved (step S106: Yes), the on-board control device 104 performs control so as to stop the train 100 by controlling the braking devices 112 (step S107).

Figure 3:
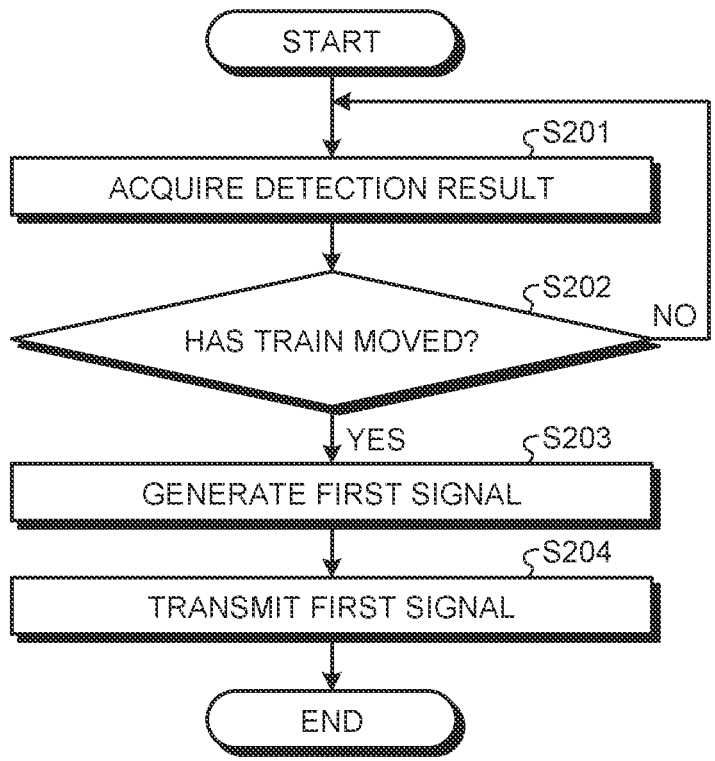
FIG. 3 is a flowchart illustrating operation of a ground apparatus according to the first embodiment.

Operation of the ground apparatus 200 will be described with reference to a flowchart. FIG. 3 is a flowchart illustrating operation of the ground apparatus 200 according to the first embodiment. In the ground apparatus 200, the base device 203 acquires a detection result from the train movement detection sensor 205 (step S201). The base device 203 determines whether the detection result indicates movement of the train 100 (step S202). When determining that the detection result does not indicate movement of the train 100 (step S202: No), the base device 203 returns to step S201 and repeats the above-described operation. When determining that the detection result indicates movement of the train 100 (step S202: Yes), the base device 203 generates a first signal for notifying that the train 100 has moved (step S203). The base device 203 transmits the generated first signal to the train 100 via the ground wireless device 201 (step S204).

Note that when the movement of the train 100 is detected in the train control system 300, a record of transmission of the first signal remains in the base device 203 even in a case where the train 100 has already stopped. Therefore, a worker or the like can actually take measures to prevent movement of the train 100. Examples of the measures to prevent movement include operating the braking devices 112 in a cab (not illustrated) of the train 100, and putting wheel chocks between wheels of the train 100 and the rails 206.

Next, a hardware configuration of the on-board apparatus 120 will be described. In the on-board apparatus 120, the communication unit 102 of the on-board wireless device 101 is a wireless communication device. The switch 105 is a relay. The battery 106 is a storage battery. The power supply device 107 is a power conversion circuit. The start processing unit 103 of the on-board wireless device 101 and the on-board control device 104 are implemented by processing circuitry. The processing circuitry may be a memory and a processor that executes a program stored in the memory, or may be dedicated hardware.

Figure 4:
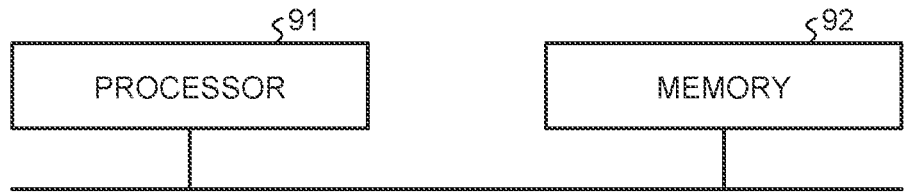
FIG. 4 is a diagram showing an example in which processing circuitry included in the on-board apparatus according to the first embodiment includes a processor and a memory.

FIG. 4 is a diagram showing an example in which processing circuitry included in the on-board apparatus 120 according to the first embodiment includes a processor and a memory. In a case where the processing circuitry includes a processor 91 and a memory 92, each function of the processing circuitry of the on-board apparatus 120 is implemented by software, firmware, or a combination of software and firmware. The software or firmware is described as a program, and stored in the memory 92. The processor 91 reads and executes the program stored in the memory 92 to implement each function of the processing circuitry. That is, the processing circuitry includes the memory 92 for storing programs. As a result of execution of the programs, the on-board apparatus 120 is caused to perform processing. In addition, it can also be said that these programs cause a computer to execute a procedure and a method for the on-board apparatus 120.

Here, the processor 91 may be a central processing unit (CPU), a processing device, an arithmetic device, a microprocessor, a microcomputer, a digital signal processor (DSP), or the like. Furthermore, for example, a nonvolatile or volatile semiconductor memory such as a random access memory (RAM), a read only memory (ROM), a flash memory, an erasable programmable ROM (EPROM), or an electrically EPROM (EEPROM) (registered trademark), a magnetic disk, a flexible disk, an optical disk, a compact disk, a mini disk, or a digital versatile disc (DVD) is applicable to the memory 92.

Figure 5:
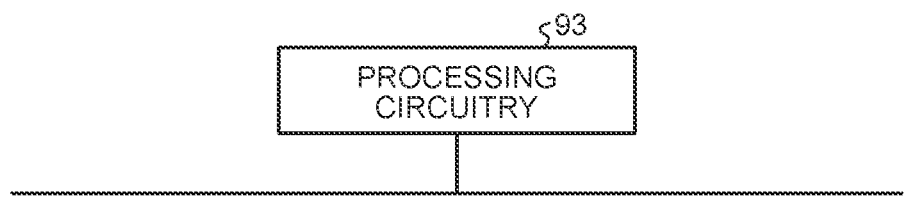
FIG. 5 is a diagram showing an example in which the processing circuitry included in the on-board apparatus according to the first embodiment includes dedicated hardware.

FIG. 5 is a diagram showing an example in which the processing circuitry included in the on-board apparatus 120 according to the first embodiment includes dedicated hardware. In a case where the processing circuitry includes dedicated hardware, for example, a single circuit, a composite circuit, a programmed processor, a parallel-programmed processor, an application specific integrated circuit (ASIC), a field programmable gate array (FPGA), or a combination thereof is applicable to processing circuitry 93 illustrated in FIG. 5. The functions of the on-board apparatus 120 may be separately implemented by the processing circuitry 93, or may be collectively implemented by the processing circuitry 93.

Note that some of the functions of the on-board apparatus 120 may be implemented by dedicated hardware, and some of the other functions thereof may be implemented by software or firmware. Thus, the processing circuitry can implement each of the above-described functions by means of dedicated hardware, software, firmware, or a combination thereof.

A hardware configuration of the ground apparatus 200 will be described. In the ground apparatus 200, the ground wireless device 201 is a wireless communication device. The base device 203 and the interlocking device 204 are implemented by processing circuitry. The processing circuitry may be a memory and a processor that executes a program stored in the memory, or may be dedicated hardware.

As described above, according to the present embodiment, the train 100 supplies power to the on-board wireless device 101 without supplying power to the on-board control device 104 while the train 100 is staying overnight. When receiving, from the ground apparatus 200, the first signal notifying that the train 100 has moved, the on-board wireless device 101 causes the battery 106 to supply power to the on-board control device 104, and starts the on-board control device 104. The started on-board control device 104 performs control so as to stop the train 100. In a case where the train 100 does not move while staying overnight, the train 100 is put in a state in which power is supplied only to the on-board wireless device 101. As a result, while achieving a reduction in power to be consumed during an overnight stay, the train 100 can be stopped in a case where the train 100 moves during the overnight stay.

Second Embodiment

In the first embodiment, in a case where the on-board control device 104 is started while the train 100 is staying overnight, the on-board control device 104 calculates the location of the train 100, and stops the train 100 after determining that the train 100 is moving. In a second embodiment, the on-board control device 104 immediately stops the train 100 in a case where the on-board control device 104 is started while the train 100 is staying overnight. A difference from the first embodiment will be described.

In the second embodiment, the configuration of the train control system 300 is the same as that in the first embodiment. In the second embodiment, when acquiring, from the train movement detection sensor 205, a detection result indicating that the train 100 has moved, the base device 203 generates a second signal serving as an instruction to stop the train 100, together with a first signal for notifying that the train 100 has moved. The base device 203 performs control so as to transmit the generated first signal and second signal to the train 100 via the ground wireless device 201.

In the train 100, the communication unit 102 of the on-board wireless device 101 outputs the first signal to the start processing unit 103. In addition, the communication unit 102 of the on-board wireless device 101 outputs the second signal to the on-board control device 104 after the on-board control device 104 is started. Upon acquiring the second signal, the on-board control device 104 performs control so as to stop the train 100 by controlling the braking devices 112 without calculating the location of the train 100. That is, when the on-board wireless device 101 receives the second signal together with the first signal, the on-board control device 104 performs control so as to stop the train 100.

Figure 6:
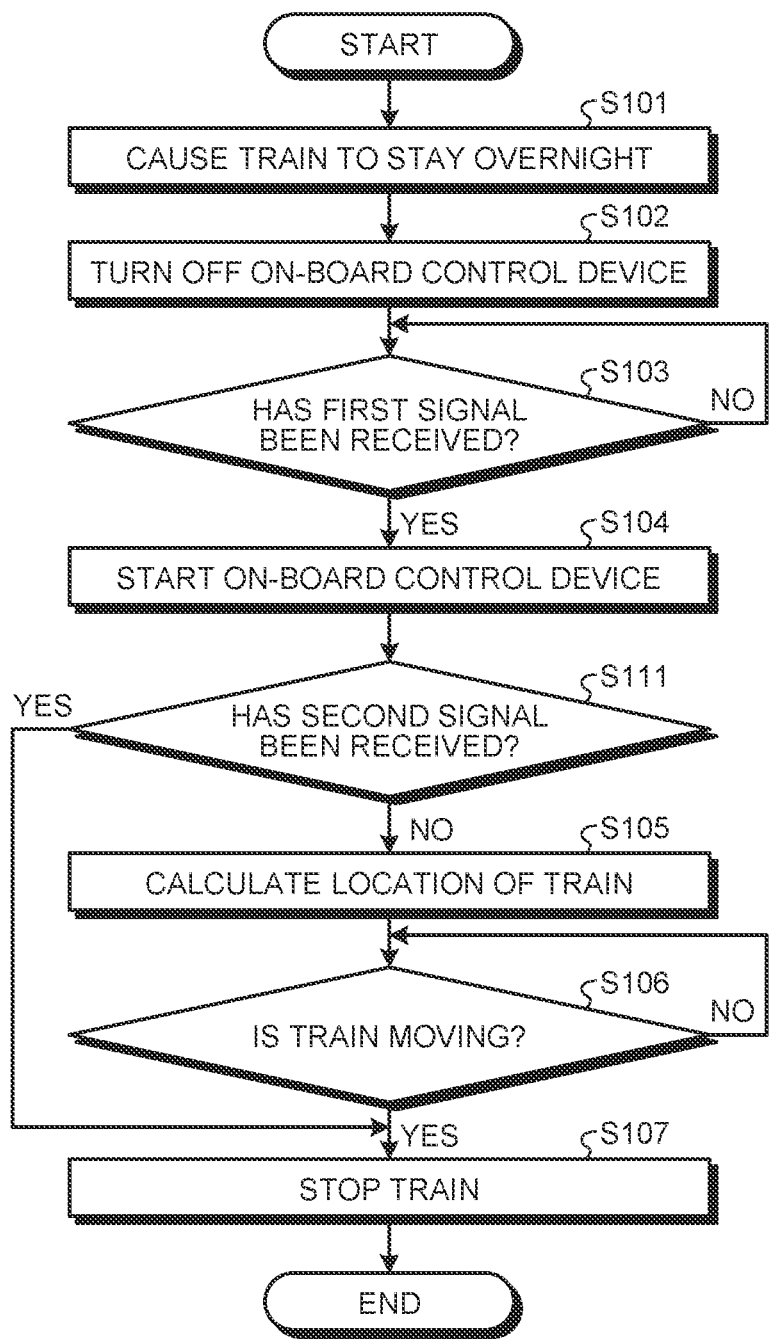
FIG. 6 is a flowchart illustrating operation of an on-board apparatus installed on a train according to a second embodiment.

FIG. 6 is a flowchart illustrating operation of the on-board apparatus 120 installed on the train 100 according to the second embodiment. Operation to be performed in steps S101 to S104 is the same as the operation in the first embodiment illustrated in the flowchart of FIG. 2. Upon being started, the on-board control device 104 determines, after step S104, whether the second signal has been received from the on-board wireless device 101 (step S111). When the second signal has not been received (step S111: No), the on-board control device 104 proceeds to step S105. Operation to be performed in subsequent steps S105 to S107 is the same as the operation in the first embodiment illustrated in the flowchart of FIG. 2. When receiving the second signal (step S111: Yes), the on-board control device 104 proceeds to step S107. Operation to be performed in subsequent step S107 is the same as the operation in the first embodiment illustrated in the flowchart of FIG. 2.

Figure 7:
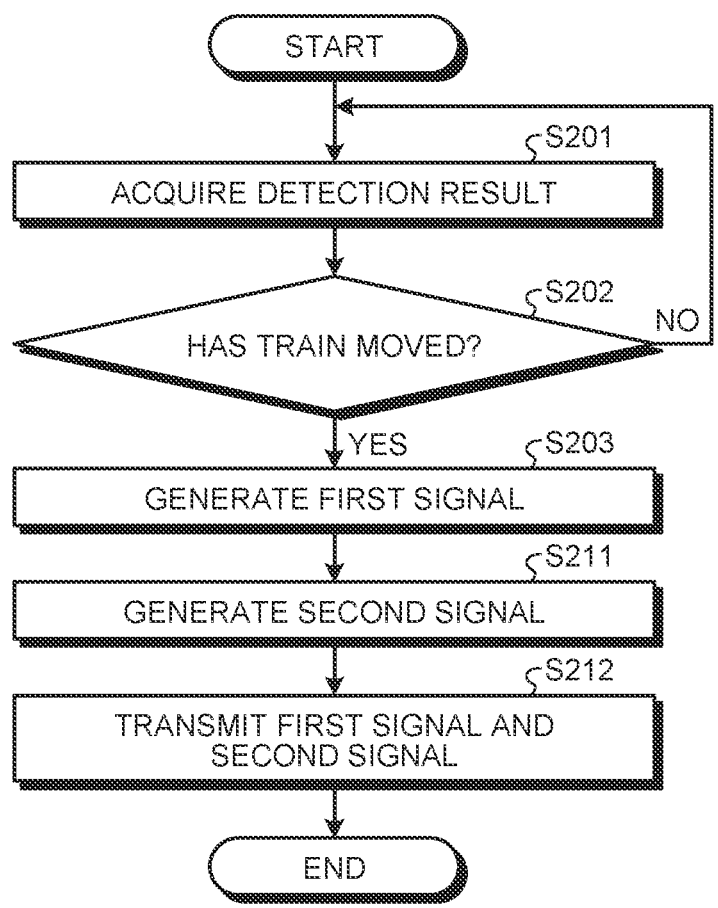
FIG. 7 is a flowchart illustrating operation of a ground apparatus according to the second embodiment.

FIG. 7 is a flowchart illustrating operation of the ground apparatus 200 according to the second embodiment. Operation to be performed in steps S201 to S203 is the same as the operation in the first embodiment illustrated in the flowchart of FIG. 3. After step S203, the base device 203 generates a second signal serving as an instruction to stop the train 100 (step S211). The base device 203 transmits the generated first signal and second signal to the train 100 via the ground wireless device 201 (step S212).

As described above, according to the present embodiment, when receiving the second signal from the ground apparatus 200, the train 100 stops without calculating the location of the train 100. As a result, while achieving a reduction in power to be consumed during an overnight stay as in the first embodiment, the train 100 can stop immediately as compared with the first embodiment.

Third Embodiment

In the first embodiment, while the train 100 is staying overnight, the start processing unit 103 of the on-board wireless device 101 controls the switch 105 to control power supply to the on-board control device 104. In a third embodiment, a start processing unit controls power supply to the on-board control device 104 without using the switch 105. The first embodiment will be cited as an example in describing the present embodiment. However, the present embodiment is also applicable to the second embodiment.

Figure 8:
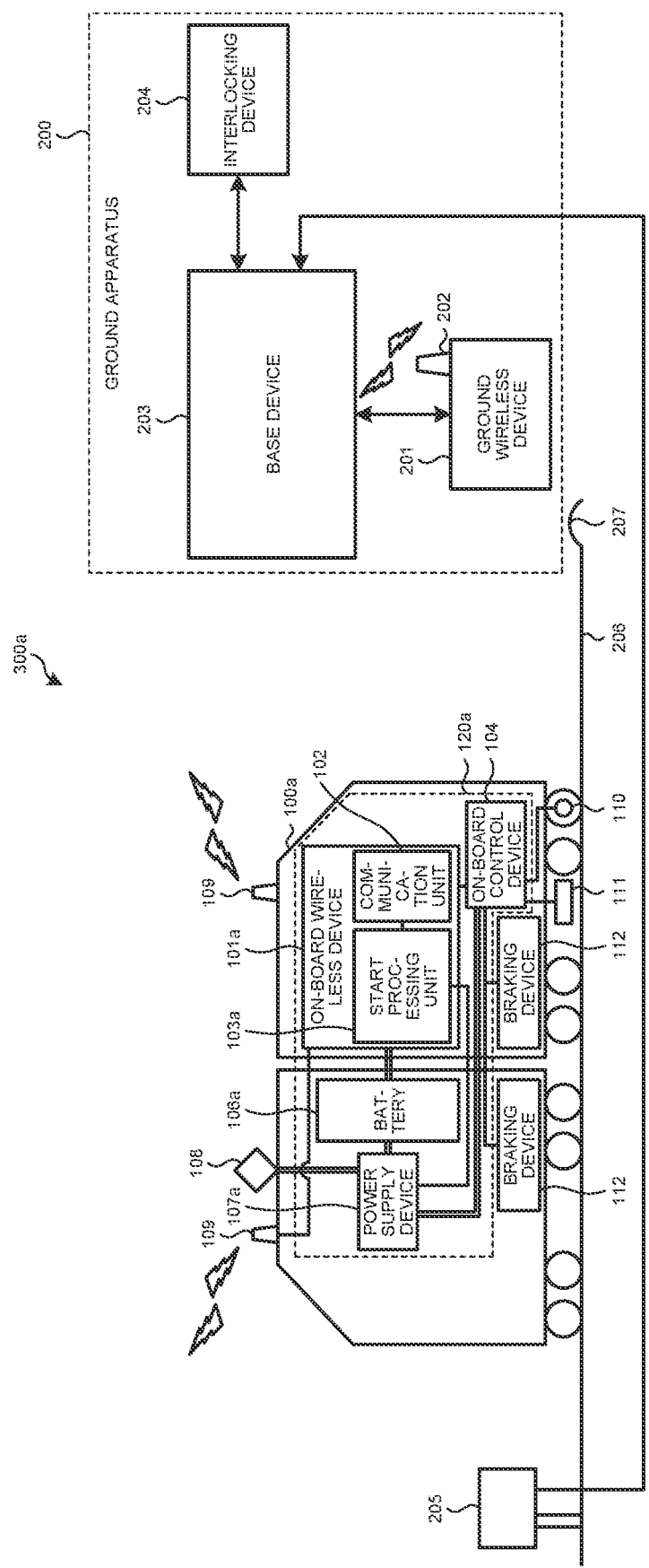
FIG. 8 is a diagram showing a configuration example of a train control system according to a third embodiment.

FIG. 8 is a diagram showing a configuration example of a train control system 300*a* according to the third embodiment. The train control system 300*a* is obtained by replacement of the train 100 with a train 100*a*, in the train control system 300 of the first embodiment illustrated in FIG. 1. The train 100*a* is obtained by replacement of the on-board apparatus 120 of the train 100 of the first embodiment illustrated in FIG. 1 with an on-board apparatus 120*a*. The on-board apparatus 120*a* includes an on-board wireless device 101*a*, the on-board control device 104, a battery 106*a*, and a power supply device 107*a*. The on-board wireless device 101*a* includes the communication unit 102 and a start processing unit 103*a*.

In a case where while the train 100*a* is staying overnight, and the communication unit 102 receives, from the ground apparatus 200, a first signal notifying that the train 100*a* has moved, the start processing unit 103*a* causes power to be supplied to the on-board control device 104 to start the on-board control device 104. Specifically, when receiving the first signal, the start processing unit 103*a* raises the pantograph 108 to cause the pantograph 108 to acquire power, and causes the power supply device 107*a* to supply the power to the on-board control device 104. In the example of FIG. 8, the start processing unit 103*a* raises the pantograph 108 via the power supply device 107*a*, but may raise the pantograph 108 by issuing an instruction to a device (not illustrated) that raises and lowers the pantograph 108. Normally, the start processing unit 103*a* causes the power supply device 107*a* to supply power to the on-board control device 104 while the train 100*a* is in operation, and does not cause the power supply device 107*a* to supply power to the on-board control device 104 while the train 100*a* is staying overnight.

The battery 106*a* stores power supplied from the power supply device 107*a* while the train 100*a* is in operation. The battery 106a supplies power to the on-board wireless device 101a while the train 100a is in operation and while the train 100a is staying overnight.

The power supply device 107a converts power collected by the pantograph 108 from an overhead line (not illustrated) into power that can be used by pieces of equipment installed on the train 100a. The power supply device 107a also performs rectification in a case where the power collected by the pantograph 108 from the overhead line is AC power. The power supply device 107a outputs the converted power to the battery 106a and the on-board control device 104.

Next, operation in the train control system 300a will be described in which the ground apparatus 200 detects movement of the train 100a and the train 100a stops the movement.

When operation is finished, the train 100a stays overnight at a specified place. At this time, the train 100a lowers the pantograph 108 to stop power supply from the overhead line under the control of the on-board control device 104 or the power supply device 107a. In addition, the start processing unit 103a of the on-board wireless device 101a stops power supply from the power supply device 107a to the on-board control device 104. That is, in the case of a normal overnight stay during which the train 100a does not move, power is supplied from the battery 106a to the on-board wireless device 101a, but is not supplied from the power supply device 107a to the on-board control device 104 in the train 100a. As a result, the train 100a can reduce power to be consumed by the train 100a during an overnight stay.

Power is not supplied from the power supply device 107a to the on-board control device 104. Therefore, the train 100a cannot calculate the location of the train 100a. Meanwhile, power is supplied from the battery 106a to the on-board wireless device 101a. Thus, the train 100a can receive a signal from the ground apparatus 200.

Operation of the ground apparatus 200 is the same as the operation thereof in the first embodiment. In the train 100a staying overnight, the communication unit 102 of the on-board wireless device 101a outputs, to the start processing unit 103a, a signal received from the ground apparatus 200. The start processing unit 103a determines the type of the received signal. When determining that the first signal has been received, the start processing unit 103a raises the pantograph 108 to cause the pantograph 108 to acquire power, and causes the power supply device 107a to supply the power to the on-board control device 104. Subsequent operation of the on-board control device 104 is the same as the operation thereof in the first embodiment. Operation of the train 100a can be illustrated by the same flowchart as the flowchart of the first embodiment provided in FIG. 2.

As described above, according to the present embodiment, because the switch 105 is not necessary, the train 100a can be more simply configured than the train 100 of the first embodiment and at the same time, it is possible to obtain the same effects as those of the first embodiment.

Note that the case where power provided from the outside is supplied through the overhead line has been described in the first to third embodiments, but a means of power supply is not limited to the overhead line. For example, power may be supplied by a third-rail system.

Fourth Embodiment

The first to third embodiments are based on the assumption that the trains 100 and 100a are electric trains. Meanwhile, the present invention can also be applied to a train that runs by using an internal combustion engine instead of electricity. Note that although the first embodiment or the third embodiment will be cited as an example in describing the present embodiment, the present embodiment is also applicable to the second embodiment.

Figure 9:
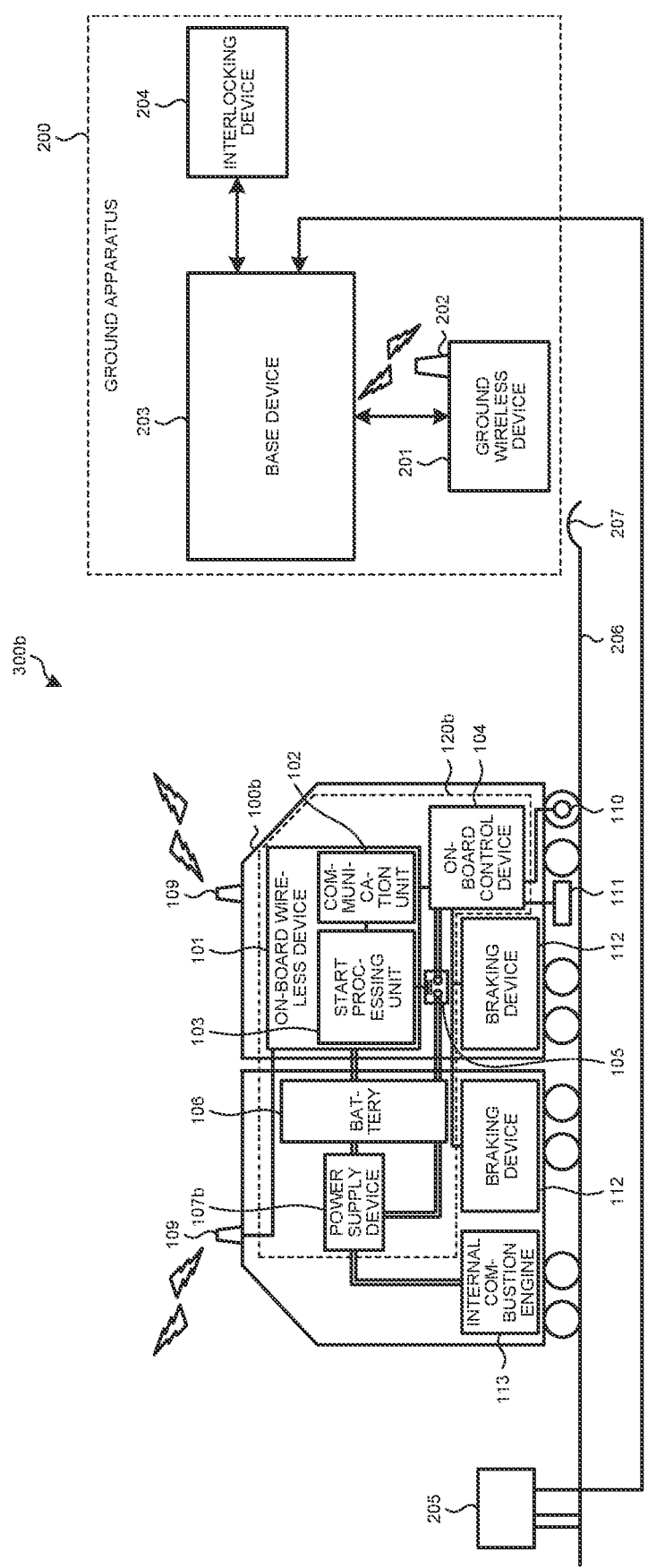
FIG. 9 is a diagram showing a first configuration example of a train control system according to a fourth embodiment.

FIG. 9 is a diagram showing a configuration example of a train control system 300b according to a fourth embodiment. The train control system 300b is obtained by replacement of the train 100 with a train 100b, in the train control system 300 of the first embodiment illustrated in FIG. 1. The train 100b is obtained by removal of the power supply device 107 and the pantograph 108 from the train 100 of the first embodiment illustrated in FIG. 1 and addition of a power supply device 107b and an internal combustion engine 113. An on-board apparatus 120b to be installed on the train 100b includes the on-board wireless device 101, the on-board control device 104, the switch 105, the battery 106, and the power supply device 107b.

The internal combustion engine 113 is a diesel engine that causes the train 100b to run. The internal combustion engine 113 outputs, to the power supply device 107b, power generated during operation.

The power supply device 107b converts power generated by the internal combustion engine 113 into power that can be used by pieces of equipment installed on the train 100b. The power supply device 107b outputs the converted power to the battery 106.

Figure 10:
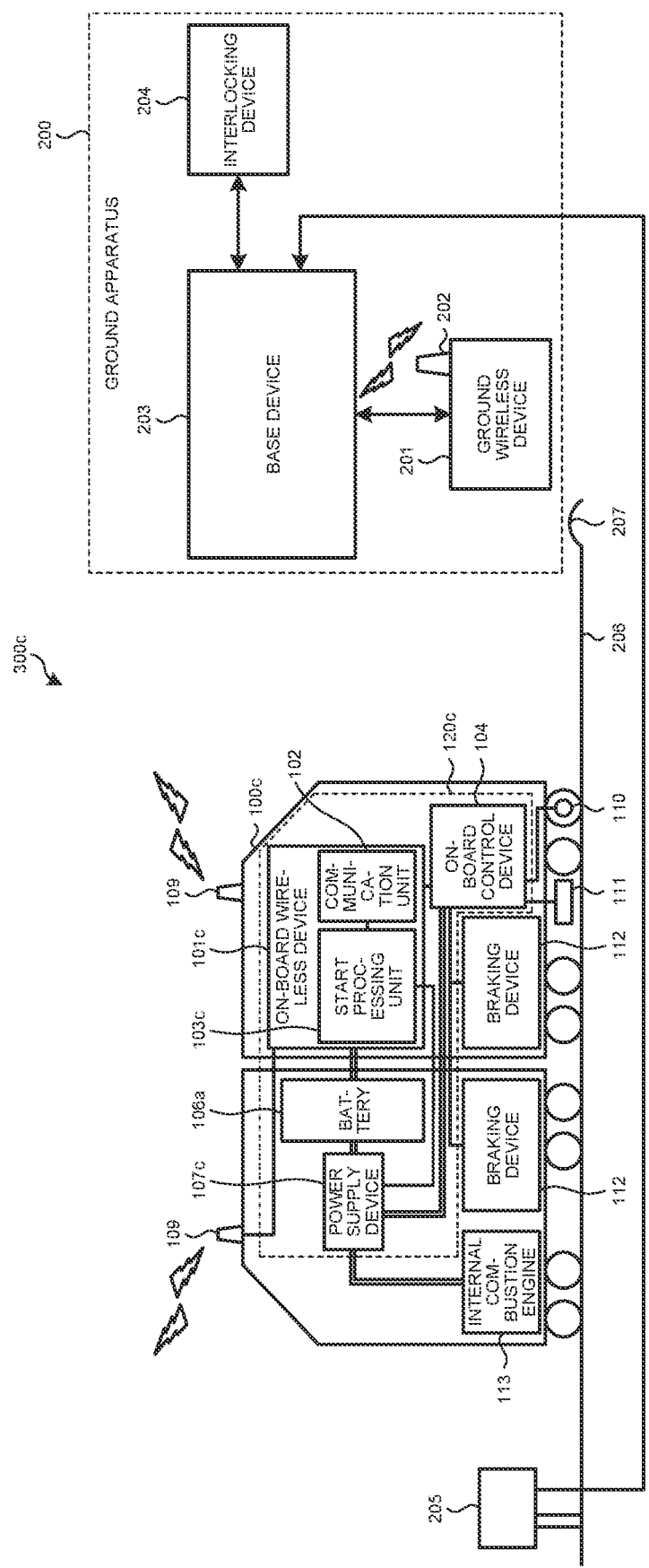
FIG. 10 is a diagram showing a second configuration example of the train control system according to the fourth embodiment.

FIG. 10 is a diagram showing a configuration example of a train control system 300c according to the fourth embodiment. The train control system 300c is obtained by replacement of the train 100a with a train 100c, in the train control system 300a of the third embodiment illustrated in FIG. 8. The train 100c is obtained by removal of the on-board wireless device 101a, the power supply device 107a, and the pantograph 108 from the train 100a of the third embodiment illustrated in FIG. 8, and addition of an on-board wireless device 101c, a power supply device 107c, and the internal combustion engine 113. The on-board wireless device 101c includes the communication unit 102 and a start processing unit 103c. An on-board apparatus 120c to be installed on the train 100c includes the on-board wireless device 101c, the on-board control device 104, the battery 106a, and the power supply device 107c.

In a case where while the train 100c is staying overnight, and the communication unit 102 receives, from the ground apparatus 200, a first signal notifying that the train 100c has moved, the start processing unit 103c causes power to be supplied to the on-board control device 104 to start the on-board control device 104. Specifically, when receiving the first signal, the start processing unit 103c starts the internal combustion engine 113 to generate power, and causes the power supply device 107c to supply the power to the on-board control device 104. In the example of FIG. 10, the start processing unit 103c starts the internal combustion engine 113 via the power supply device 107c, but may instruct the internal combustion engine 113 to start. Normally, the start processing unit 103c causes the power supply device 107c to supply power to the on-board control device 104 while the train 100c is in operation, and does not cause the power supply device 107c to supply power to the on-board control device 104 while the train 100c is staying overnight.

The power supply device 107c converts power generated by the internal combustion engine 113 into power that can be used by pieces of equipment installed on the train 100c. The power supply device 107c outputs the converted power to the battery 106a and the on-board control device 104.

Operation of the train 100b and the train 100c can be illustrated by the same flowchart as the flowchart of the first embodiment provided in FIG. 2.

As described above, according to the present embodiment, it is possible to achieve the same effects as those of the first to third embodiments even in a case where the present embodiment is applied to a train that is not an electric train but a train using an internal combustion engine.

The configurations set forth in the above embodiments show examples of the subject matter of the present invention, and it is possible to combine the configurations with another technique that is publicly known, and is also possible to make omissions and changes to part of the configurations without departing from the gist of the present invention.

REFERENCE SIGNS LIST 100, 100a, 100b, 100c train; 101, 101a, 101c on-board wireless device; 102 communication unit; 103, 103a, 103c start processing unit; 104 on-board control device; 105 switch; 106, 106a battery; 107, 107a, 107b, 107c power supply device; 108 pantograph; 109, 202 antenna; 110 tacho-generator; 111 pickup coil; 112 braking device; 113 internal combustion engine; 120, 120a, 120b, 120c on-board apparatus; 200 ground apparatus; 201 ground wireless device; 203 base device; 204 interlocking device; 205 train movement detection sensor; 206 rail; 207 bumping post; 300, 300a, 300b, 300c train control system.

The invention claimed is:

1. An on-board apparatus to be installed on a train, the apparatus comprising:
an on-board control device comprising first processing circuitry to control running and stopping of the train during operation of the train; and
an on-board wireless device comprising second processing circuitry to perform wireless communication with a ground apparatus, and start the first processing circuitry of the on-board control device when receiving a first signal from the ground apparatus while the train is staying at a specified place, the first signal notifying that the train moves, wherein
while the train is staying at the specified place, the first processing circuitry of the on-board control device is started under control of the second processing circuitry of the on-board wireless device, and performs control so as to stop the train.

2. The on-board apparatus according to claim 1, further comprising:
a switch to connect or disconnect a battery to or from the first processing circuitry, wherein
when receiving the first signal, the second processing circuitry controls the switch to connect the battery to the first processing circuitry and cause the battery to supply power to the first processing circuitry.

3. The on-board apparatus according to claim 1, further comprising:
a power conversion circuit to convert power collected by a pantograph into power that can be used by pieces of equipment installed on the train, the pantograph collecting power from an overhead line, wherein
when receiving the first signal, the second processing circuitry causes the pantograph to acquire power, and causes the power conversion circuit to supply the power to the first processing circuitry.

4. The on-board apparatus according to claim 1, further comprising:
a power conversion circuit to convert power generated by an internal combustion engine into power that can be used by pieces of equipment installed on the train, the internal combustion engine causing the train to run, wherein
when receiving the first signal, the second processing circuitry causes the internal combustion engine to generate power, and causes the power conversion circuit to supply the power to the first processing circuitry.

5. The on-board apparatus according to claim 1, wherein
when detecting movement of the train while the train is staying at the specified place, the first processing circuitry performs control so as to stop the train.

6. The on-board apparatus according to claim 1, wherein
when the second processing circuitry receives a second signal together with the first signal, the second signal serving as an instruction to stop the train, the first processing circuitry performs control so as to stop the train.

7. A ground apparatus comprising:
wireless communication device to perform wireless communication with a train; and
third processing circuitry to perform control so as to transmit a first signal to the train via the wireless communication device when acquiring a detection result from a train movement detection sensor while the train is staying at a specified place, the first signal notifying that the train moves, the detection result indicating that the train moves, the train movement detection sensor detecting movement of the train.

8. The ground apparatus according to claim 7, wherein
the third processing circuitry performs control so as to transmit the first signal to a single train.

9. The ground apparatus according to claim 7, wherein
the third processing circuitry performs control so as to transmit the first signal to a plurality of trains.

10. The ground apparatus according to claim 7, wherein
the third processing circuitry performs control so as to transmit a second signal together with the first signal, the second signal serving as an instruction to stop the train.

11. A train control system comprising:
the on-board apparatus according to claim 1, and
a ground apparatus comprising:
a wireless communication device to perform wireless communication with a train; and
third processing circuitry to perform control so as to transmit a first signal to the train via the wireless communication device when acquiring a detection result from a train movement detection sensor while the train is staying at the specified place, the first signal notifying that the train moves, the detection result indicating that the train moves, the train movement detection sensor detecting movement of the train.

12. The on-board apparatus according to claim 2, wherein
when detecting movement of the train while the train is staying at the specified place, the first processing circuitry performs control so as to stop the train.

13. The on-board apparatus according to claim 3, wherein
when detecting movement of the train while the train is staying at the specified place, the first processing circuitry performs control so as to stop the train.

14. The on-board apparatus according to claim 4, wherein when detecting movement of the train while the train is staying at the specified place, the first processing circuitry performs control so as to stop the train.

15. The on-board apparatus according to claim 2, wherein when the second processing circuitry receives a second signal together with the first signal, the second signal serving as an instruction to stop the train, the first processing circuitry performs control so as to stop the train.

16. The on-board apparatus according to claim 3, wherein when the second processing circuitry receives a second signal together with the first signal, the second signal serving as an instruction to stop the train, the first processing circuitry performs control so as to stop the train.

17. The on-board apparatus according to claim 4, wherein when the second processing circuitry receives a second signal together with the first signal, the second signal serving as an instruction to stop the train, the first processing circuitry performs control so as to stop the train.

18. The ground apparatus according to claim 8, wherein the third processing circuitry performs control so as to transmit a second signal together with the first signal, the second signal serving as an instruction to stop the train.

19. The ground apparatus according to claim 9, wherein the third processing circuitry performs control so as to transmit a second signal together with the first signal, the second signal serving as an instruction to stop the train.

20. The train control system according to claim 11, wherein
when the second processing circuitry receives a second signal together with the first signal, the second signal serving as an instruction to stop the train, the first processing circuitry performs control so as to stop the train, and
the third processing circuitry of the ground apparatus performs control so as to transmit a second signal together with the first signal, the second signal serving as an instruction to stop the train.

* * * * *